(12) United States Patent
Aoshima et al.

(10) Patent No.: US 11,788,337 B2
(45) Date of Patent: Oct. 17, 2023

(54) OPENING/CLOSING MEMBER CONTROL DEVICE

(71) Applicant: DENSO CORPORATION, Kariya (JP)

(72) Inventors: Hiroki Aoshima, Kariya (JP); Kazuyuki Shibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 168 days.

(21) Appl. No.: 17/299,269

(22) PCT Filed: Jan. 24, 2020

(86) PCT No.: PCT/JP2020/002487
§ 371 (c)(1),
(2) Date: Jun. 2, 2021

(87) PCT Pub. No.: WO2020/153469
PCT Pub. Date: Jul. 30, 2020

(65) Prior Publication Data
US 2022/0034143 A1 Feb. 3, 2022

(30) Foreign Application Priority Data

Jan. 25, 2019 (JP) .................................. 2019-011408
May 15, 2019 (JP) .................................. 2019-092384

(51) Int. Cl.
*E05F 15/00* (2015.01)
*E05F 15/40* (2015.01)
*E05F 15/689* (2015.01)

(52) U.S. Cl.
CPC ............ *E05F 15/40* (2015.01); *E05F 15/689* (2015.01); *E05Y 2400/33* (2013.01);
(Continued)

(58) Field of Classification Search
CPC ....... E05F 15/41; E05F 15/689; E05F 15/695; E05F 15/60; E05F 15/40; E05Y 2800/41;
(Continued)

(56) References Cited

U.S. PATENT DOCUMENTS 5,689,168 A * 11/1997 Bogwicz ................. H02P 25/04
318/786
9,617,777 B2 * 4/2017 Aoshima ............... E05F 15/695
(Continued)

FOREIGN PATENT DOCUMENTS

EP 2096731 A2 9/2009
JP H06-327279 A 11/1994
(Continued)

*Primary Examiner* — Chi Q Nguyen
(74) *Attorney, Agent, or Firm* — Oliff PLC

(57) ABSTRACT

An opening-closing member control device includes a motor that opens and closes an opening-closing member of a vehicle, and a control unit configured to stop the motor when determining that a foreign object has been entrapped by the opening-closing member and reverse the motor when a delay time elapses after stopping the motor. When the control unit determines that entrapment has occurred upon operation of a remote operation switch that is separated from the vehicle, the control unit reverses the motor after the delay time that is shorter than when determining that entrapment has occurred upon operation of a vehicle operation switch that is arranged in the vehicle.

9 Claims, 6 Drawing Sheets

(52) U.S. Cl.
CPC ..... *E05Y 2400/36* (2013.01); *E05Y 2400/554* (2013.01); *E05Y 2400/66* (2013.01); *E05Y 2900/55* (2013.01)

(58) Field of Classification Search
CPC ........... E05Y 2900/55; E05Y 2400/564; E05Y 2400/36; E05Y 2400/315; E05Y 2400/309; E05Y 2400/51; E05Y 2400/342; E05Y 2400/33; E05Y 2400/554; E05Y 2400/66
USPC .................. 49/31, 26, 28; 318/455, 433, 62; 180/446
See application file for complete search history.

(56) References Cited

U.S. PATENT DOCUMENTS

| | | | | |
|---|---|---|---|---|
| 10,060,171 | B2* | 8/2018 | Aoshima | E05F 15/41 |
| 11,142,940 | B2* | 10/2021 | Aoshima | E05F 15/41 |
| 11,454,061 | B2* | 9/2022 | Fujita | E05F 15/695 |
| 2004/0124801 | A1 | 7/2004 | Jurado et al. | |
| 2005/0276449 | A1* | 12/2005 | Pedemas | E05F 15/431 |
| | | | | 382/104 |
| 2007/0052293 | A1* | 3/2007 | Shibata | H02H 7/0851 |
| | | | | 307/10.1 |
| 2007/0183182 | A1* | 8/2007 | Pribisic | H03K 17/955 |
| | | | | 365/145 |
| 2008/0100241 | A1* | 5/2008 | Takahashi | E05F 15/41 |
| | | | | 318/434 |
| 2008/0110092 | A1* | 5/2008 | Takahashi | E05F 15/695 |
| | | | | 318/434 |
| 2009/0058340 | A1* | 3/2009 | Sakai | G05B 9/02 |
| | | | | 318/434 |
| 2012/0323370 | A1* | 12/2012 | Nishikibe | E05F 15/40 |
| | | | | 700/275 |
| 2014/0083001 | A1* | 3/2014 | Alcov | A01G 13/105 |
| | | | | 47/20.1 |
| 2014/0239867 | A1 | 8/2014 | Bessho et al. | |

FOREIGN PATENT DOCUMENTS

| | | |
|---|---|---|
| JP | 2003-253939 A | 9/2003 |
| JP | 2010-150851 A | 7/2010 |
| JP | 2014-034831 A | 2/2014 |
| JP | 2015-124489 A | 7/2015 |
| JP | 2016-211272 A | 12/2016 |

* cited by examiner

Fig.8

| | Temperature | | | |
|---|---|---|---|---|
| | High (greater than or equal to 40°C) | Normal | | Low (less than or equal to 0°C) |
| Actuation load [N·m] | – | Less than 2N·m (87 rps) | 2N·m (87 rps) or greater | – |
| Rotation Speed of Motor | High | High | Low | Low |
| Inertial Load | Large | Large | Small | Small |
| Increase: Entrapment Threshold Value | – | – | Performed | Performed |
| Erroneous Reverse Risk | Low | Low | High | High |
| Decrease: Entrapment Threshold Value | Performed | Performed | – | – |

Fig.9

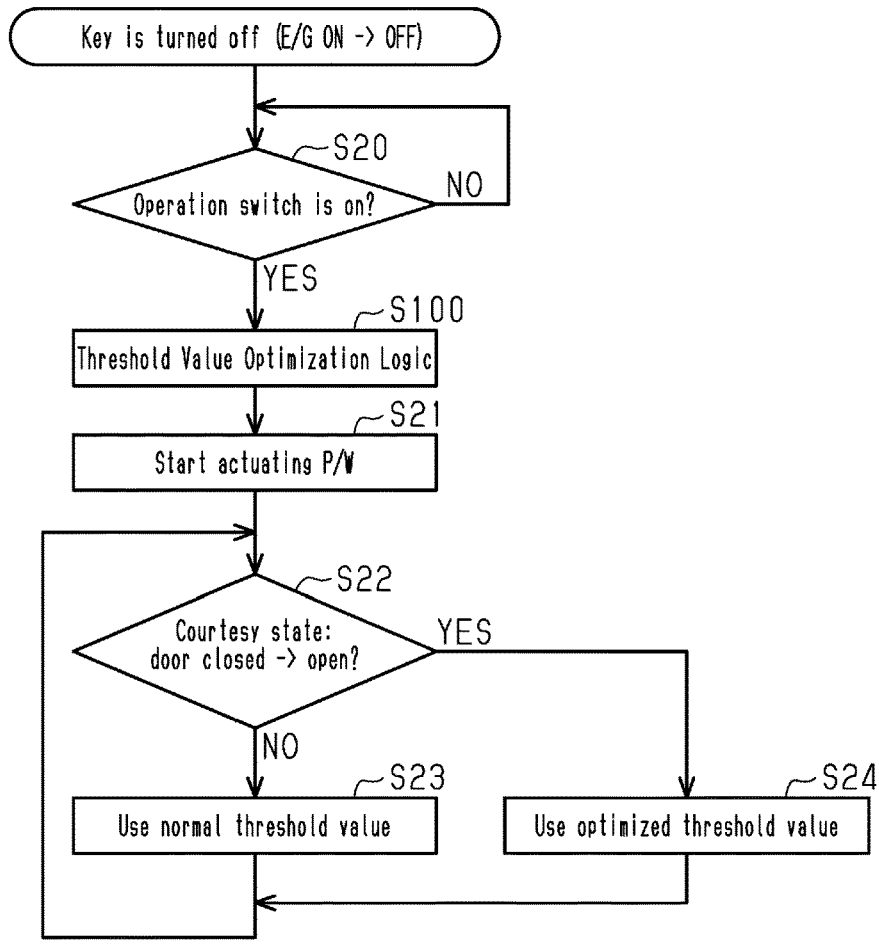

OPENING/CLOSING MEMBER CONTROL DEVICE

CROSS-REFERENCE TO RELATED APPLICATIONS

The present application is based on Japanese Patent Application No. 2019-011408 filed on Jan. 25, 2019 and Japanese Patent Application No. 2019-092384 filed on May 15, 2019, the entire contents of which are incorporated herein by reference.

TECHNICAL FIELD

The present disclosure relates to an opening-closing member controller for a vehicle.

BACKGROUND ART

A power window controller is one example of an opening-closing member controller installed in a vehicle (refer to, for example, Patent Document 1). A conventional power window controller may have functionality that prevents a foreign object from being entrapped by a closing window glass. Such a power window controller performs an entrapment detection process that monitors changes in the rotation speed of a motor serving as a drive source to detect a foreign object that hampers the movement of the window glass and stops or reverses the motor when detecting a foreign object. This reduces the load that may act on the foreign object.

Further, a technique for opening and closing a window glass with a power window controller by operating a portable device or the like that is separated from a vehicle is known in the art (refer to Patent Document 2).

PRIOR ART DOCUMENTS

Patent Documents

Patent Document 1: Japanese Laid-Open Patent Publication No. 2014-34831
Patent Document 2: Japanese Laid-Open Patent Publication No. 2003-253939

SUMMARY OF THE INVENTION

An opening-closing member controller such as a power window controller may include an entrapment prevention functionality that stops a motor when determining that entrapment of a foreign object has occurred and then reverses the motor when a delay time, which is set in advance for circuit protection, of, for example, tens of milliseconds elapses. However, when a portable device is operated to close the window glass as described above, the user will not be present nearby. Thus, there is a need to reduce the entrapment load as compared with when a vehicle operation switch in the vehicle is operated to close the window glass.

It is an objective of the present disclosure to provide an opening-closing member controller that reduces an entrapment load when a remote operation switch is operated.

An opening-closing member control device according to the present disclosure includes a motor that opens and closes an opening-closing member of a vehicle, and a control unit configured to stop the motor when determining that a foreign object has been entrapped by the opening-closing member and reverse the motor when a delay time elapses after stopping the motor. When the control unit determines that entrapment has occurred upon operation of a remote operation switch that is separated from the vehicle, the control unit reverses the motor after a delay time that is shorter than when determining that entrapment has occurred upon operation of a vehicle operation switch that is arranged in the vehicle.

With this configuration, when the control unit determines that entrapment has occurred upon operation of the remote operation switch that is separated from the vehicle, the control unit reverses the motor after the delay time that is shorter than when determining that entrapment has occurred upon operation of the vehicle operation switch that is arranged in the vehicle. This reduces the entrapment load when the remote operation switch is operated. Further, if entrapment occurs when the vehicle operation switch that is arranged in the vehicle is operated, the control unit provides sufficient delay time to reduce the damage that may be inflicted to the drive circuit. In this manner, when the vehicle operation switch that is arranged in the vehicle is operated, the damage that may be inflicted to the drive circuit is reduced. When the remote operation switch is operated, priority is given to the reduction of the entrapment load.

BRIEF DESCRIPTION OF THE DRAWINGS

The objective, other objectives, features, and advantages of the present disclosure will be clear in the detailed description below with reference to the accompanying drawings;

FIG. 8 is a diagram illustrating the relationship between the ambient temperature of the opening-closing member controller and an entrapment determination threshold value in the second embodiment; and FIG. 9 is a flowchart showing an example of control performed by the opening-closing member controller in the second embodiment.

MODES FOR CARRYING OUT THE INVENTION

A power window controller, which serves as an opening-closing member controller, according to a first embodiment will now be described with reference to FIGS. 1 to 3.

Figure 1:
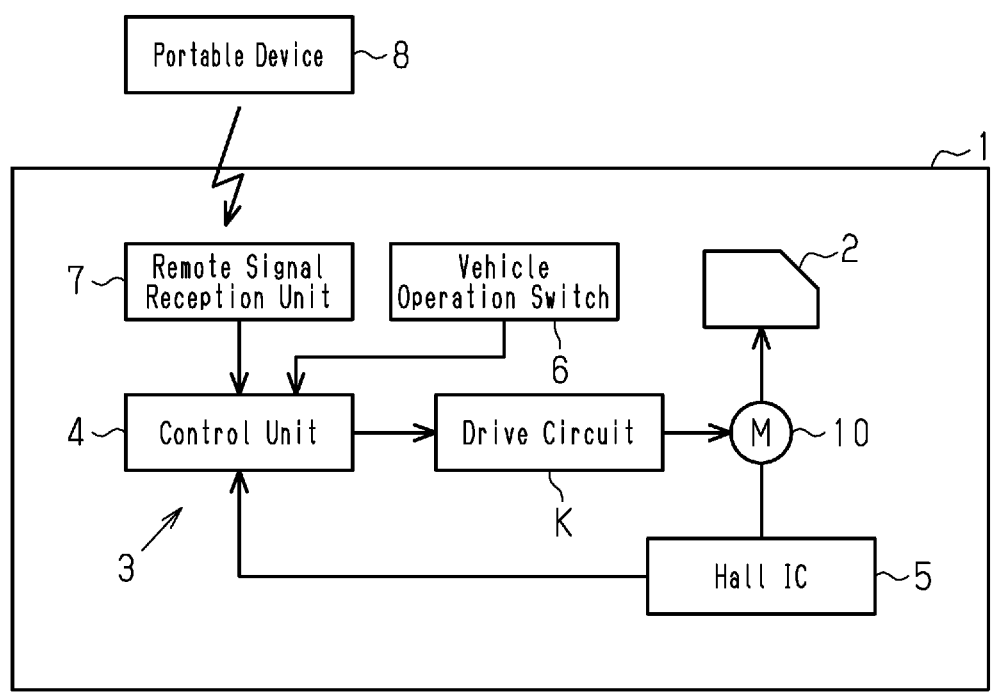
FIG. 1 is a schematic block diagram of a vehicle according to a first embodiment.

As shown in FIG. 1, a door of a vehicle 1 includes a window glass 2 that serves as an opening-closing member and is movable up and down. The window glass 2 is drive-connected to a motor 10 of a power window controller 3 by a regulator or the like (not shown).

The power window controller 3 includes the motor 10, a control unit 4, a drive circuit K, and a Hall IC 5 serving as a rotation detection unit. The control unit 4 may be circuitry including: 1) one or more processors that execute various processes according to a computer program (software); 2) one or more dedicated hardware circuits (application specific integrated circuits: ASIC) that execute at least part of various processes, or 3) a combination thereof. The processor includes a CPU and memory such as RAM and ROM. The memory stores program code or commands configured to cause the CPU to execute processes. The memory, or computer-readable media, include any type of media that are accessible by versatile computers or dedicated computers. The control unit 4 is connected to the Hall IC 5. The control unit 4 is also connected to the motor 10 by the drive circuit K. The drive circuit K of the present embodiment is formed by a relay circuit. The Hall IC 5 provides the control unit 4 with pulse signals corresponding to changes in the magnetic flux of a sensor magnet that is rotated integrally with the rotary shaft of the motor 10.

The control unit 4 is also connected to a vehicle operation switch 6 and a remote signal reception unit 7 that are installed in the vehicle 1. The remote signal reception unit 7 is configured to receive a signal indicative of an operation of a portable device 8 such as a mobile phone or a remote control key, which serves as a remote operation switch separated from the vehicle 1.

If the control unit 4 receives the signal when the vehicle operation switch 6 or the portable device 8 is operated, the control unit 4 controls the drive circuit K and drives the motor 10 in accordance with the signal to open or close (vertically move) the window glass 2.

When the window glass 2 is closing, the control unit 4 monitors the rotation speed of the window glass 2 with the pulse signals from the Hall IC 5 and determines whether the window glass 2 has entrapped a foreign object.

The control unit 4 stops the motor 10 when determining that entrapment has occurred. When a delay time elapses after stopping the motor 10, the control unit 4 reverses the motor 10 to open the window glass 2.

When the occurrence of entrapment is determined upon operation of the portable device 8, the control unit 4 of the first embodiment reverses the motor 10 after a shorter delay time than when the occurrence of entrapment is determined upon operation of the vehicle operation switch 6. In this case, the control unit 4 of the present embodiment reverses the motor 10 with a fixed delay time set in advance regardless of the driving state, such as rotation speed, of the motor 10. That is, the control unit 4 reverses the motor 10 after a preset normal delay time set in advance when determining that entrapment has occurred upon operation of the vehicle operation switch 6 and reverses the motor 10 after a preset delay time that is shorter than the normal delay time when determining that entrapment has occurred upon operation of the portable device 8.

The operation of the control unit 4 will now be described in detail.

Figure 2:
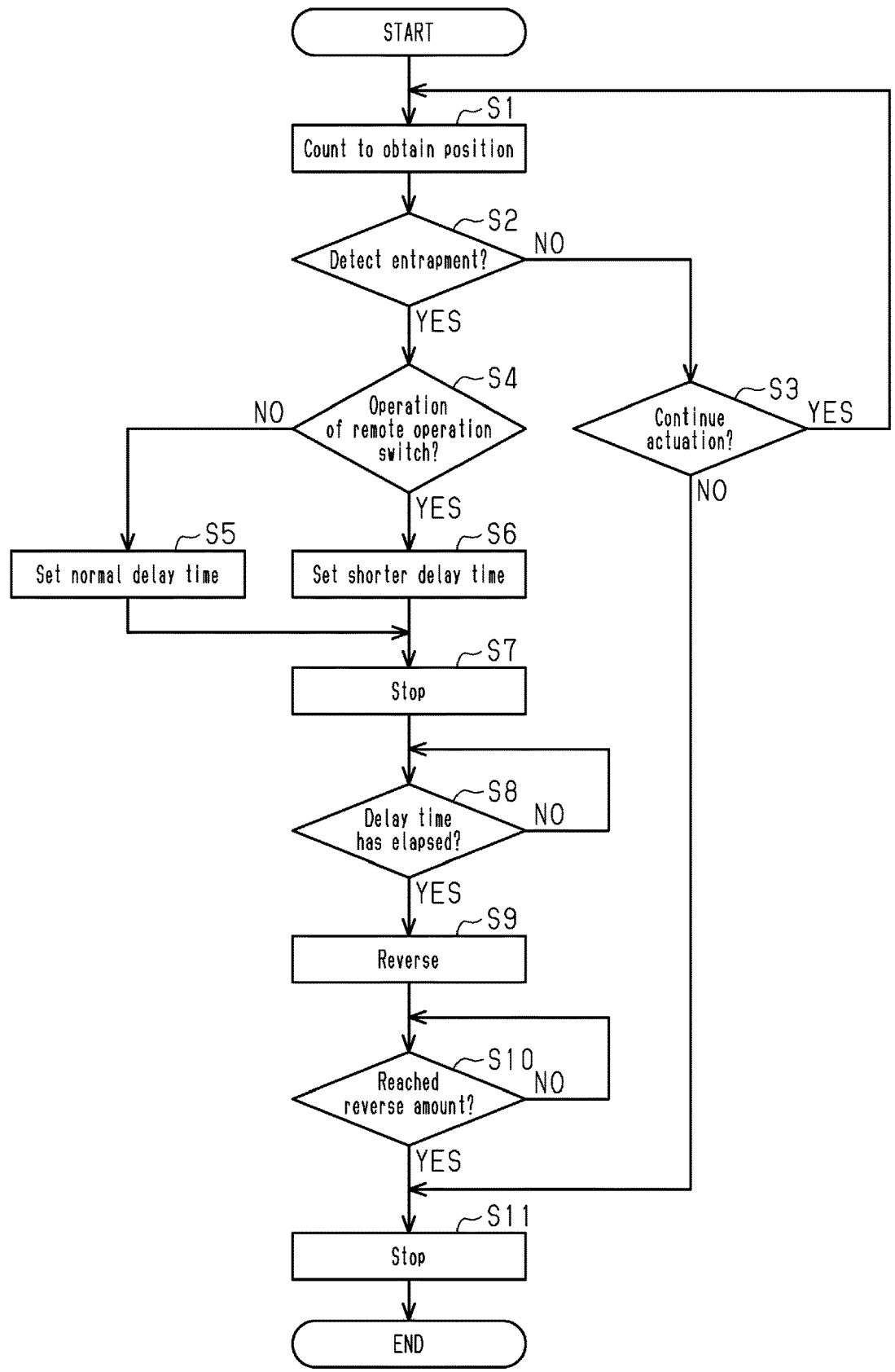
FIG. 2 is a flowchart illustrating a process executed by a control unit shown in FIG. 1.

As shown in FIG. 2, when the vehicle operation switch 6 or the portable device 8 is operated to close the window glass 2, the control unit 4 executes processing from step S1.

In step S1, the control unit 4 counts the pulse signals from the Hall IC 5 to obtain the position and proceeds to step S2.

In step S2, the control unit 4 determines whether the window glass 2 has entrapped a foreign object. When determining that entrapment of a foreign object has not occurred, the control unit 4 proceeds to step S3.

In step S3, the control unit 4 determines whether to continue actuation. For example, when automatic control is being executed to close the window glass 2 to a fully closed position, the control unit 4 determines whether the window glass 2 has reached the fully closed position. When non-automatic control is being executed, the control unit 4 determines whether the vehicle operation switch 6 is being continuously operated. When continuing the closing action, the control unit 4 returns to step S1. When not continuing the closing action, the control unit 4 proceeds to step S11 to stop the motor 10 and end the process.

When determining that the window glass 2 has entrapped a foreign object in step S2, the control unit 4 proceeds to step S4.

Figure 3:
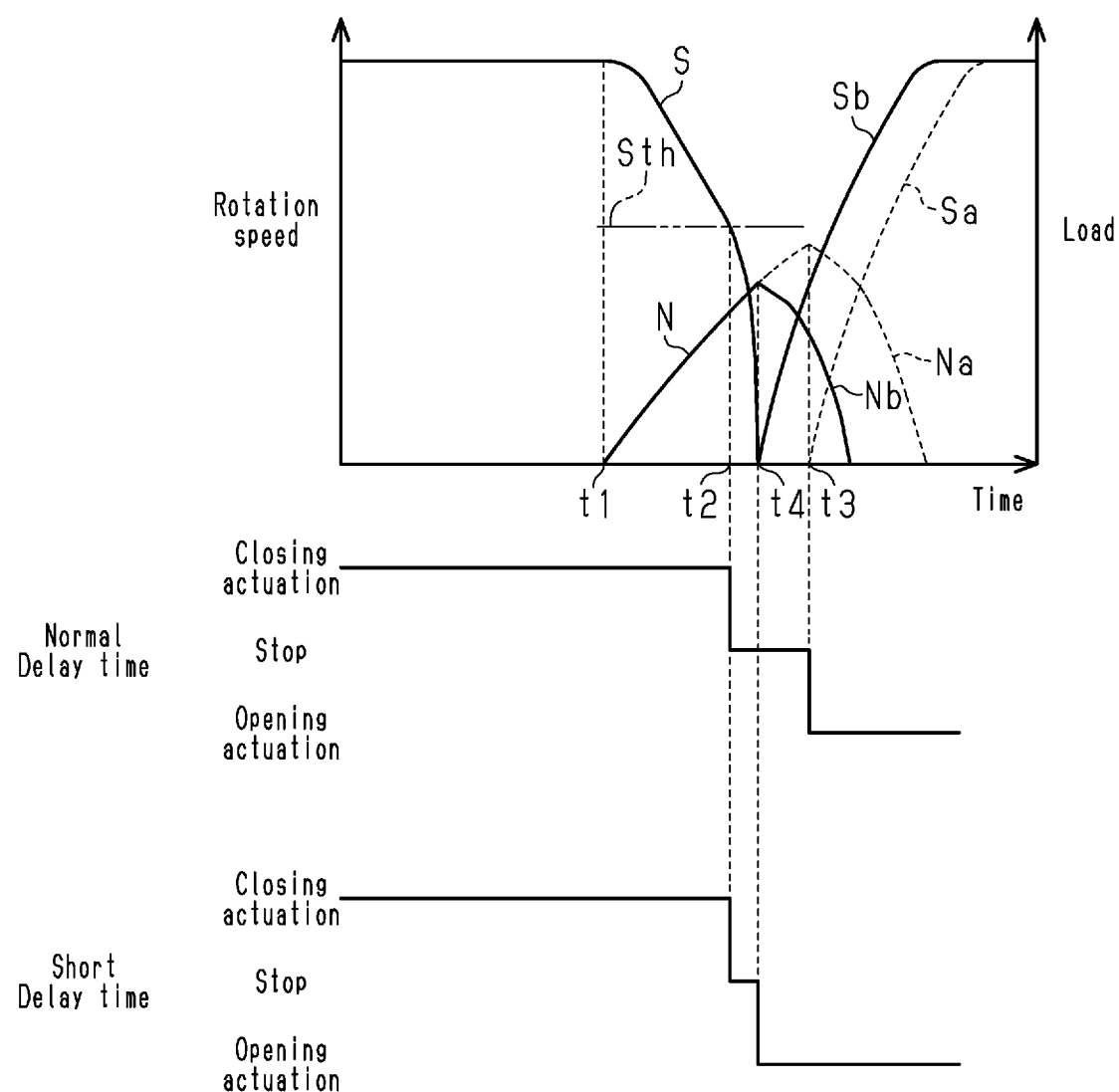
FIG. 3 is a characteristic diagram showing a rotation speed and load relative to time in the first embodiment.

As shown in FIG. 3, the rotation speed S declines from time t1, which is when a foreign object is entrapped, and the load N acting on the foreign object increases from time t1. The control unit 4 of the present embodiment determines that entrapment of a foreign object has occurred at time t2, which is when the rotation speed S becomes less than or equal to a threshold value Sth.

In step S4, the control unit 4 determines whether the current closing action was started by operation of the portable device 8. When determining that the closing action was not started by operation of the portable device 8, that is, when determining that the closing action was started by the vehicle operation switch 6, the control unit 4 proceeds to step S5. When determining that the closing action was started by operation of the portable device 8, the control unit 4 proceeds to step S6.

In step S5, the control unit 4 sets the delay time to the normal delay time and proceeds to step S7.

In step S6, the control unit 4 sets the delay time to a shorter delay time than the normal delay time and then proceeds to step S7.

In step S7, the control unit 4 stops the motor 10 and proceeds to step S8.

In step S8, the control unit 4 determines whether the set delay time has elapsed. When determining that the set delay time has elapsed, the control unit 4 proceeds to step S9.

In step S9, the control unit 4 reverses the motor 10 and proceeds to step S10.

In this case, as shown in FIG. 3, time t3, which is when the rotation speed Sa in the opening direction begins to increase when the delay time is normal, is delayed from time t4, which is when the rotation speed Sb in the opening direction begins to increase when the delay time is short. Thus, the load Na acting on a foreign object when the delay time is normal may become greater than the load Nb acting on a foreign object when the delay time is short. In this manner, when the portable device 8 is operated, the short delay time is set to reduce the load Nb that acts on the foreign object.

In step S10, the control unit 4 determines whether the window glass 2 has reached a preset reverse amount. When the control unit 4 determines that the window glass 2 has reached the reverse amount, the control unit 4 proceeds to step S11 to stop the motor 10 and then ends the process.

The first embodiment has the following advantages.

(1) When determining that entrapment has occurred upon operation of the portable device 8, the control unit 4 reverses the motor 10 after a delay time that is shorter than when determining that entrapment has occurred upon operation of the vehicle operation switch 6. This reduces the entrapment load when the portable device 8 is operated. Further, if entrapment occurs when the vehicle operation switch 6 is operated, the control unit 4 provides sufficient delay time to reduce the damage that may be inflicted to the drive circuit K. In this manner, when the vehicle operation switch 6 is operated, the damage that may be inflicted to the drive circuit K is reduced. When the portable device 8 is operated, priority is given to the reduction of the entrapment load.

(2) When determining that entrapment has occurred upon operation of the portable device 8, the control unit 4 reverses the motor 10 after a fixed present delay time regardless of the driving state, such as the rotation speed, of the motor 10. This simplifies control more than when changing the delay time in accordance with, for example, the driving state of the motor 10.

The first embodiment may be modified and implemented as described below. Further, the first embodiment and the following modifications can be combined as long as the combined modifications remain technically consistent with each other.

In the first embodiment, when the control unit 4 determines that entrapment has occurred upon operation of the portable device 8, the control unit 4 reverses the motor 10 after a fixed preset delay time regardless of the driving state, such as the rotation speed, of the motor 10. Instead, the control unit 4 may reverse the motor 10 after a delay time that is based on the driving state of the motor 10. This obtains an effect that is suitable for the driving state of the motor 10.

For example, the control unit 4 may further shorten the delay time if the rotation speed of the motor 10, which is the driving state, is high when the portable device 8 is operated and entrapment occurs. Specifically, the control unit 4 may change the delay time, for example, in multiple stages or a continuous manner so that the delay time is shortened as the rotation speed of the motor 10, which is the driving state, increases when the portable device 8 is operated and entrapment occurs. This further reduces the entrapment load.

Alternatively, the control unit 4 may lengthen the delay time if the rotation speed of the motor 10, which is the driving state, is high when the portable device 8 is operated and entrapment occurs. Specifically, the control unit 4 may change the delay time, for example, in multiple stages or in a continuous manner so that the delay time is lengthened as the rotation speed of the motor 10, which is the driving state, increases when the portable device 8 is operated and entrapment occurs. In this case, the delay time is lengthened in a range that is less than the normal delay time in the above embodiment. This reduces damage to the drive circuit K while reducing the entrapment load.

In the first embodiment, the drive circuit K includes a relay circuit. Instead, the drive circuit K may include a different element such as an FET.

In the first embodiment, the control unit 4 sets a delay time after determining that entrapment of a foreign object has occurred. Instead, the delay time may be set, for example, before determining whether entrapment of a foreign object has occurred.

In the first embodiment, the present disclosure is embodied in the power window controller 3 connected to the window glass 2 that serves as an opening-closing member. Instead, the present disclosure may be embodied in a different opening-closing member controller that opens and closes another opening-closing member such as a roof panel.

A power window controller, which serves as an opening-closing member controller, according to a second embodiment will now be described with reference to FIGS. 4 to 9. The control of the second embodiment may be executed independently from the control of the first embodiment or in addition to the control of the first embodiment.

Figure 4:
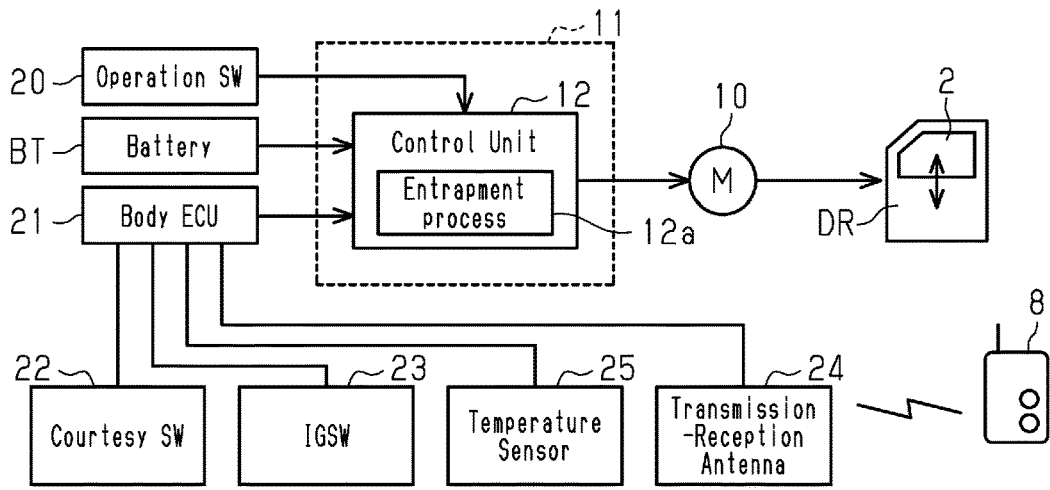
FIG. 4 is a schematic diagram showing a system that includes an opening-closing member controller according to a second embodiment.

The motor 10 shown in FIG. 4 includes a power window motor coupled to the inside of a vehicle door DR to automatically open and close the window glass 2, which serves as an opening-closing member, of the vehicle door DR. A power window controller 11 (motor controller, power window ECU) that controls the motor 10 is integrated with the motor 10.

The power window controller 11 includes the control unit 4. The control unit 4 controls the rotation produced by the motor 10 with a drive circuit (not shown) in accordance with an operation of a vehicle operation switch 20 arranged on the vehicle door DR. The drive circuit includes a relay supplied with power from a vehicle battery BT. The rotation of the motor body 10 is transmitted to the window glass 2 via a window regulator (not shown) to open and close the window glass 2 in the vertical direction.

The control unit 4 is connected in a manner allowing for communication to a body electric control unit (ECU) 21, which serves as an upper rank ECU, via a vehicle communication system. The vehicle communication system may be a local interconnect network (LIN) or a controller area network (CAN). The control unit 4 obtains various types of necessary vehicle information from the body ECU 21. In the present embodiment, the control unit 4 obtains, through the body ECU 21, a door opening and closing signal from a courtesy switch (courtesy SW) 22 that detects an open and closed state of the vehicle door DR and an IG state signal from an ignition switch (IG SW) 23.

The body ECU 21 is connected to a transmission-reception antenna 24 that is configured to receive locking and unlocking signals for the vehicle door DR and opening and closing actuation signals that open and close the window glass 2 from the portable device 8, which serves as a remote operation switch. The body ECU 21 is connected to a temperature sensor 25 that measures the ambient temperature. The temperature sensor 25 may be arranged in any part of a vehicle body. The temperature sensor 25 may be arranged, for example, near a front bumper or on a side mirror. The control unit 4 obtains, through the body ECU 21, opening and closing actuation signals from the transmission-reception antenna 24 and ambient temperature information from the temperature sensor 25.

The control unit 4 of the power window controller 11 includes an entrapment processing unit 4a. The entrapment processing unit 4a determines whether the closing window glass 2 has entrapped a foreign object from driving information of the motor 10. The entrapment processing unit 4a determines that a foreign object has been entrapped when the rotation speed of the motor 10, more specifically, the length of a pulse output by the motor 10 reaches an entrapment determination threshold value Th. When the entrapment processing unit 4a determines that a foreign object has been entrapped, the entrapment processing unit 4a, for example, controls the motor 10 to open the window glass 2 for a predetermined amount in order to release the entrapped foreign object. The entrapment processing unit 4a may determine whether a foreign object has been jammed between the opening window glass 2 and the vehicle door DR. In this case, for example, the entrapment processing unit 4a controls the motor 10 to close the window glass 2 for a predetermined amount in order to allow the jammed foreign object to be released.

The control unit 4 of the present embodiment further corrects the entrapment determination threshold value Th based on the voltage supplied to the motor 10 and the ambient temperature.

An entrapment process when the voltage supplied to the motor 10 is varied will now be described with reference to FIGS. 5A and 5B.

Figure 5A:
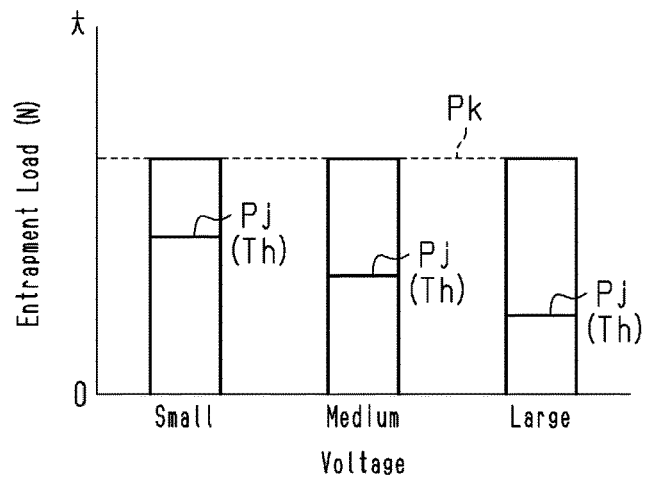
FIG. 5A is a diagram illustrating the relationship between a supply voltage and an entrapment load in the second embodiment.

FIG. 5A illustrates one example of the present embodiment in which the entrapment determination threshold value Th is corrected. FIG. 5B illustrates a referential example in which the entrapment determination threshold value Th is not corrected. In FIGS. 5A and 5B, detected load Pj indicates the entrapment load at an entrapment determination threshold value Th reached when a foreign object is entrapped, and inertial load Pk is the entrapment load when the window glass 2 serving as an opening-closing member actually stops. In FIGS. 5A and 5B, the inertial load Pk, which is obtained when the window glass 2 actually stops is increased from the detected load Pj, which is obtained when reaching the entrapment determination threshold value Th.

Figure 5B:
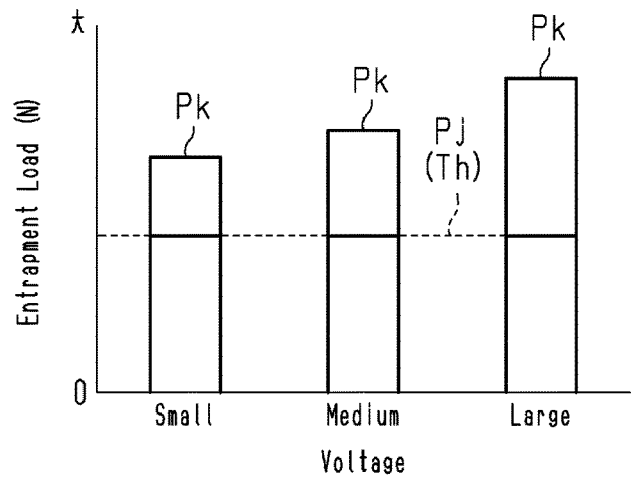
FIG. 5B is a diagram illustrating the relationship between a supply voltage and an entrapment load in a referential example.

As shown in FIG. 5B, the entrapment load when the entrapment determination threshold value Th is reached is substantially constant even when the voltage applied to the motor 10 is varied. However, the inertial load Pk from when the entrapment determination threshold value Th is reached until the window glass 2 is stopped is varied in accordance with the voltage. That is, the load acting on a foreign object will vary in accordance with the voltage. This may adversely affect entrapment determination.

As shown in FIG. 5A, when the entrapment determination threshold value Th is corrected in accordance with the voltage, the inertial load Pk will be substantially constant even if the voltage changes. Thus, the load acting on a foreign object will be substantially constant regardless of the difference in voltage. This allows for appropriate entrapment determination.

The control unit 4 of the present embodiment corrects the entrapment determination threshold value Th based on the ambient temperature as described above. Specifically, the control unit 4 compares a normal temperature determination threshold values Tj, which are used to determine whether the ambient temperature is normal, with the ambient temperature detected by the temperature sensor 25 and determines whether the ambient temperature is within the range of the normal temperature determination threshold values Tj. The normal temperature determination threshold values Tj are set in the range of 0° C.<Tj<40° C.

As shown in FIG. 8, when the ambient temperature is high and greater than or equal to 40° C., the rotation speed of the motor 10 has a tendency to increase. When the ambient temperature is low and less than or equal to 0° C., the rotation speed of the motor 10 has a tendency to decrease. The inertial load Pk increases as the rotation speed of the motor 10 increases, and the inertial load Pk decreases as the rotation speed of the motor 10 decreases. That is, when the ambient temperature is low, the rotation speed of the motor 10 decreases and the difference between the inertial load Pk and the detected load Pj is small. This may result in an erroneous entrapment determination. Thus, the entrapment determination threshold value Th is increased (positive correction) when the ambient temperature is low to increase the difference between the inertial load Pk and the detected load Pj and correctly perform entrapment determination. In this case, preferably, the difference between the inertial load Pk and the detected load Pj is substantially the same as when the ambient temperature is normal. In contrast, when the ambient temperature is high, the rotation speed of the motor 10 increases and the difference between the inertial load Pk and the detected load Pj is large. Thus, the entrapment determination threshold value Th is decreased (negative correction) when the ambient temperature is high to decrease the difference between the inertial load Pk and the detected load Pj. In this case, preferably, the difference between the inertial load Pk and the detected load Pj is substantially the same as when the ambient temperature is normal.

The entrapment processing (operation) performed by the power window controller 11 will now be described.

The entrapment processing performed when the window glass 2 is closed in response to a wireless signal or a remote control signal will be described as one example of entrapment processing.

Figure 6:
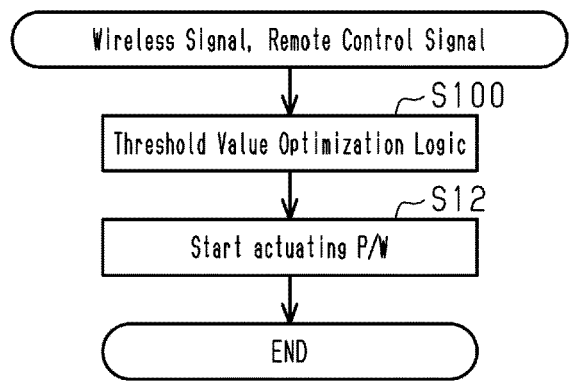
FIG. 6 is a flowchart showing an example of control performed by the opening-closing member controller in the second embodiment.

As shown in FIG. 6, when the control unit 4 receives an operation signal, such as a wireless signal or a remote control signal, for actuating the window glass 2, the control unit 4 performs a threshold value optimization logic in step S100 and then actuates the window glass 2 in step S12.

The threshold value optimization logic will now be described.

Figure 7:
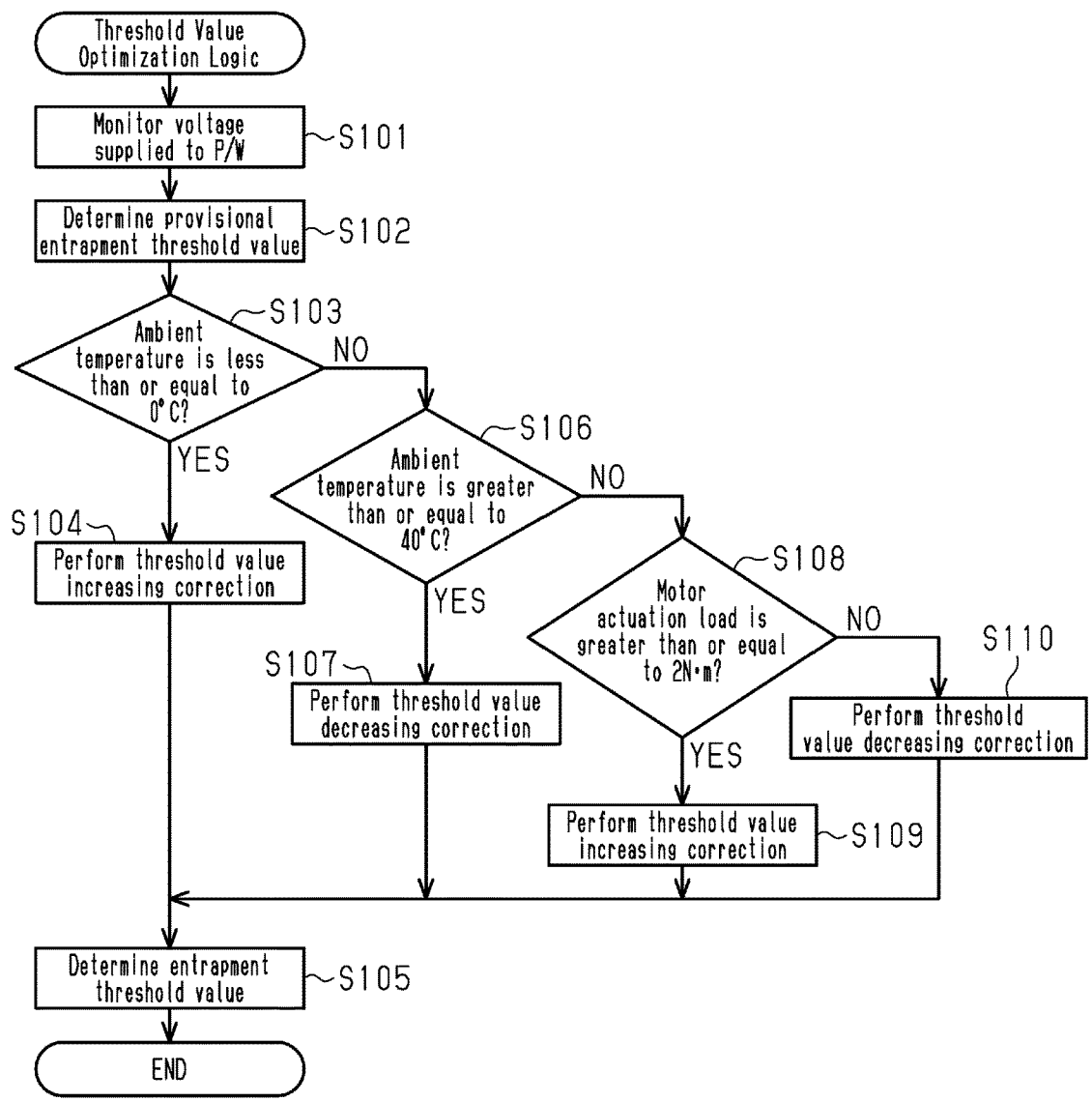
FIG. 7 is a flowchart showing an example of control performed by the opening-closing member controller in the second embodiment.

As shown in FIG. 7, in step S101, the control unit 4 monitors the voltage supplied to the power window before driving the motor 10.

In step S102, the control unit 4 determines a provisional entrapment determination threshold value Tk based on the voltage supplied to the motor 10.

In step S103, the control unit 4 determines whether the ambient temperature detected by the temperature sensor 25 is low and less than or equal to 0° C.

When the control unit 4 determines that the ambient temperature is less than or equal to 0° C. in step S103, the control unit 4 performs threshold value increasing correction in following step S104. The threshold value increasing correction determines a correcting value based on the ambient temperature to increase the entrapment determination threshold value Th (positive correction). In the threshold value increasing correction based on the ambient temperature, the correcting value is set to a value greater than 0. In this case, when the ambient temperature is less than or equal to 0° C., the correcting value may be a fixed value or increased as the ambient temperature decreases.

When the control unit 4 determines that the ambient temperature is greater than 0° C. in step S103, the control unit 4 determines whether the ambient temperature detected by the temperature sensor 25 is high and greater than or equal to 40° C. in following step S106.

When the control unit 4 determines that the ambient temperature is greater than or equal to 40° C. in step S106, the control unit 4 performs threshold value decreasing correction in following step S107. The threshold value decreasing correction determines a correcting value based on the ambient temperature to decrease the entrapment determination threshold value Th (negative correction). In the threshold value decreasing correction based on the ambient temperature, the correcting value is set to a value less than 0 (negative number). In this case, when the ambient temperature is greater than or equal to 40° C., the correcting value may be a fixed value or decreased as the ambient temperature increases.

When the control unit 4 determines that the ambient temperature is less than 40° C. in step S106, the ambient temperature is normal. Thus, in step S108, the control unit 4 determines whether the estimated actuation load on the motor 10 is greater than or equal to 2 N·m.

When the control unit 4 determines that the estimated actuation load on the motor 10 is greater than or equal to 2 N·m in step S108, the control unit 4 performs threshold value increasing correction in following step S109. The threshold value increasing correction determines a correcting value based on the estimated actuation load to increase the entrapment determination threshold value Th (positive correction). In the threshold value increasing correction based on the estimated actuation load, the correcting value is set to a value greater than 0. In this case, when the estimated actuation load is greater than or equal to 2 N·m, the correcting value may be a fixed value or increased as the actuation load increases.

When the control unit 4 determines that the estimated actuation load on the motor 10 is less than 2 N·m in step S108, the control unit 4 performs threshold value decreasing correction in following step S110. The threshold value decreasing correction determines a correcting value based on the estimated actuation load to decrease the entrapment determination threshold value Th (negative correction). In the threshold value decreasing correction based on the estimated actuation load, the correcting value is set to a value less than 0 (negative number). In this case, when the estimated actuation load is less than 2 N·m, the correcting value may be a fixed value or decreased as the actuation load decreases.

The control unit 4 determines the entrapment determination threshold value Th in step S105 after steps S104, S107, S109, and S110. Specifically, the control unit 4 adds the correcting threshold value to the provisional entrapment determination threshold value Tk. The addition, as referred to in this case, includes the addition of a negative number, that is, subtraction.

The determination of the entrapment determination threshold value Th ends the threshold value optimization logic. In step S12, the control unit 4 drives the motor 10 and starts actuating the window glass 2 using the determined entrapment determination threshold value Th.

Entrapment processing performed when the window glass 2 is closed based on the opening and closing actuation of the vehicle door DR as the ignition is turned off will be described as one example of entrapment processing.

As shown in FIG. 9, in step S20, if the control unit 4 determines that an operation signal has been received from the vehicle operation switch 20 when an ignition signal is off, the control unit 4 performs the threshold value optimization logic described above in step S100. The threshold value optimization logic determines the entrapment determination threshold value Th.

The determination of the entrapment determination threshold value Th ends the threshold value optimization logic. In step S21, the control unit 4 drives the motor 10 and starts actuating the window glass 2.

Then, in step S22, the control unit 4 determines whether the vehicle door DR has shifted from a closed state to an open state based on a door opening and closing signal sent from the courtesy switch 22.

When the control unit 4 determines that the vehicle door DR is in a closed state, the control unit 4 uses a pre-corrected entrapment determination threshold value Th instead of the entrapment determination threshold value Th corrected by the threshold value optimization logic in following step S23. Then, the control unit 4 repeats the process from step S22 until the closing actuation ends.

When the control unit 4 determines that the vehicle door DR has shifted to an open state in step S22, the control unit 4 uses the entrapment determination threshold value Th that has been corrected by the threshold value optimization logic in following step S24. Then, the control unit 4 repeats the process from step S22 until the closing actuation ends.

The second embodiment has the following advantages.

(3) The conventional opening-closing member controller sets an entrapment determination threshold value that determines entrapment of a foreign object, determines that entrapment of a foreign object has occurred when an entrapment load becomes greater than or equal to the entrapment determination threshold value, and reverses the actuation direction of a window glass, which is one example of an opening-closing member. However, the conventional opening-closing member controller may erroneously determine entrapment of a foreign object depending on the actuation environment such as the motor temperature.

In contrast, the opening-closing member controller according to the present disclosure reduces erroneous determination of entrapment of a foreign object by appropriately correcting the entrapment determination threshold value Th regardless of the actuation environment of the motor 10 such as when the ambient temperature is low or high and outside the normal range.

(4) The control unit 4 executes correction control to correct the entrapment determination threshold value Th so that the detected load Pj, which is the entrapment load when entrapment is determined, decreases as the voltage applied to the motor 10 increases. The entrapment determination threshold value Th that is appropriately corrected in accordance with the voltage applied to the motor 10 reduces erroneous determination of entrapment.

(5) The control unit 4 executes correction control to correct the entrapment determination threshold value Th based on the actuation load on the motor 10 when the ambient temperature is in the range of the normal temperature determination threshold values Tj. The entrapment determination threshold value Th corrected based on the actuation load on the motor 10 when the ambient temperature is normal allows an entrapment determination process to be performed in a further appropriate manner.

(6) The control unit 4 executes correction control when the window glass 2 is closed by a remote operation performed with the vehicle operation switch 20 of the vehicle, when the window glass 2 is closed by a wireless operation performed with the portable device 8, or when the window glass 2 is closed as the ignition is turned off and the courtesy switch 22 detects shifting of the vehicle door DR from a closed state to an open state. This allows an entrapment determination process to be appropriately performed whenever the window glass 2 is closed.

The second embodiment may be modified as follows. The above-described embodiment and the following modifications can be combined as long as the combined modifications do not technically contradict one another.

In the second embodiment, the entrapment determination threshold value Th is corrected based on the voltage supplied to the motor 10. However, the entrapment determination threshold value Th does not need to be corrected based on the voltage supplied to the motor 10. Instead, the entrapment determination threshold value Th may be corrected based on only the ambient temperature.

In the second embodiment, the entrapment determination threshold value Th for a closing action is corrected when the window glass 2 is closed by a wireless signal, when the window glass 2 is closed by a remote control signal, and when the window glass 2 is closed as the vehicle door DR opens and the vehicle key is turned off (ignition is turned off). However, the entrapment determination threshold value Th when the window glass 2 is closed may be corrected under other conditions.

In the second embodiment, the portable device 8 may include a vehicle key and a small terminal device such as a smartphone or a tablet device.

In the second embodiment, the ambient temperature information from the temperature sensor 25 is sent to the control unit 4 by the body ECU 21. Instead, the temperature sensor 25 may be connected to the control unit 4 so that the ambient temperature information is directly sent from the temperature sensor 25 to the control unit 4.

In the second embodiment, when the ambient temperature is normal (in range of normal temperature determination threshold values Tj), the positive correction is performed on the entrapment determination threshold value Th if the estimated actuation load is greater than or equal to 2 N·m, and the negative correction is performed on the entrapment determination threshold value Th if the estimated actuation load is less than 2 N·m. However, the correction of the entrapment determination threshold value Th may be suspended when the ambient temperature is normal.

The definitions of normal, low, and high ambient temperatures described in the second embodiment are examples and may be changed. That is, the range of the normal temperature determination threshold values Tj may be changed.

The window glass 2 does not have to be made from glass and may be made from plastic.

In the second embodiment, the motor body 10 may be a brush motor or a brushless motor.

In the second embodiment, the present disclosure is embodied in the power window controller of a vehicle. Instead, the present disclosure may be embodied in an opening-closing member controller that drive-controls another opening-closing member (such as sunroof) excepting the window glass 2 of the vehicle.

The modifications of the first embodiment can be combined with the modifications of the second embodiment as long as the combined modifications remain technically consistent with each other.

While the present disclosure is described with reference to examples, the present disclosure is not limited to the example or the configuration of the example. The present disclosure includes various variations and modifications within an equivalent range. In addition, various combinations and forms and other combinations and forms, which include only one element or more, shall be within the scope or a range of ideas of the present disclosure.

The invention claimed is:

1. An opening-closing member control device, comprising:
   a motor that is configured to open and close an opening-closing member of a vehicle; and
   a control unit configured to (i) stop the motor from continuing to close the opening-closing member immediately upon the control unit determining that a foreign object has been entrapped by the opening-closing member and (ii) reverse the motor after a delay time elapses after stopping the motor;
   wherein:
   the control unit is configured such that, if the control unit determines that the foreign object has been entrapped during operation of the opening-closing member by a remote operation switch that is separated from the vehicle, the control unit sets the delay time at a first delay time;
   the control unit is configured such that, if the control unit determines that the foreign object has been entrapped during operation of the opening-closing member by a vehicle operation switch that is in the vehicle, the control unit sets the delay time at a second delay time; and
   the first delay time is shorter than the second delay time.

2. The opening-closing member control device according to claim 1, wherein the control unit is configured such that if the control unit determines that the foreign object has been entrapped during the operation of the opening-closing member by the remote operation switch, the first delay time does not vary depending on a driving state of the motor.

3. The opening-closing member control device according to claim 1, wherein the control unit is configured such that, if the control unit determines that the foreign object has been entrapped during the operation of the opening-closing member by the remote operation switch, the first delay time varies depending on a driving state of the motor.

4. The opening-closing member control device according to claim 3, wherein the control unit is configured to vary the first delay time in relation to a rotation speed of the motor such that, as the rotation speed increases, the first delay time decreases.

5. The opening-closing member control device according to claim 3, wherein the control unit is configured to vary the first delay time in relation to a rotation speed of the motor such that the first delay time increases when the rotation speed increases.

6. The opening-closing member control device according to claim 1, wherein the control unit is configured to execute correction control that corrects an entrapment determination threshold value for determining that the foreign object has been entrapped to decrease an entrapment load if an ambient temperature is greater than or equal to a normal temperature determination threshold value, and corrects the entrapment determination threshold value to increase the entrapment load if the ambient temperature is less than the normal temperature determination threshold value.

7. The opening-closing member control device according to claim 6, wherein the control unit is configured to execute the correction control such that the entrapment load decreases as a voltage applied to the motor increases.

8. The opening-closing member control device according to claim 6, wherein the control unit is configured to execute the correction control based on an actuation load on the motor if the ambient temperature is in a range of the normal temperature determination threshold values.

9. The opening-closing member control device according to claim 6, wherein the control unit is configured to execute the correction control under any one of conditions including the opening-closing member is operated by the vehicle operation switch, the opening-closing member is operated by a the remote operation switch, and the opening-closing member is closed as ignition is turned off and a vehicle door detected by a switch shifts from a closed state to an open state.

\* \* \* \* \*